Patented Mar. 25, 1952

2,590,079

UNITED STATES PATENT OFFICE 2,590,079

TERTIARY BUTYL AMINES AND THEIR PREPARATION

Liese L. Abell, New York, N. Y., and William F. Bruce, Havertown, and Joseph Seifter, Willow Grove, Pa., assignors to Wyeth Incorporated, Philadelphia, Pa., a corporation of Delaware No Drawing. Application September 23, 1947, Serial No. 775,754

4 Claims. (Cl. 260—570.8)

This invention relates to a method for the preparation of amines having sympathomimetic action and further relates to the preparation of derivatives of tertiary butyl amine having important physiologically actions.

In the examination of substances having sympathomimetic action, a large number of derivatives of beta-phenylethyl amine have been studied. From the data available, it is evident that slight changes in structure may have marked effects on the physiologic action. The study of such derivatives of beta-phenyl-ethylamine has led to the valuable discovery that compounds with three carbon atoms in the side chain such as ephedrine, norhomoepinephrine, and amphetamine are much more active by oral administration than those with only two carbons in the side chain. Of the various possible compounds derived from beta-phenylethylamine, all have been rather thoroughly explored except those with alpha, alpha-disubstitution.

Insofar as is known, two methods have been proposed for the preparation of alpha, alpha-disubstituted derivatives of beta-phenylethylamine. One method depends on the availability of the substance beta-phenyl-beta hydroxy-alpha, alpha-dimethylethylamine. The method of preparing the latter compound is not so fully or exactly disclosed so that those skilled in the art can prepare it in the manner suggested and the availability of the starting compound is therefore clearly and definitely questionable. A second method requires omega, omega-dimethyl-omega-benzylaceto-phenone as a starting material and while this compound can be prepared, the yields are generally low and the entire method is unduly lengthy and complicated.

We have discovered a new method of preparing the above-mentioned alpha-alpha-disubstituted derivatives of beta-phenyl-ethylamine which can be carried out with easily available and well-known starting materials, and furthermore, which requires relatively fewer steps than heretofor proposed.

We have further discovered new methods for the preparation of N-substituted, alpha, alpha-disubstituted derivatives of beta-phenylethylamine which are easily prepared in good yield.

The N-substituted compounds prepared in accordance with our invention are new and possess unexpected valuable physiological characteristics. These compounds are volatile and less alkaline than the primary amine and consequently do not cause extended necrosis of the mucous membrane. Of primary importance however, is the discovery that these N-substituted members are far better vasoconstrictors than the primary amine in that they have a longer duration of action with considerably less central stimulating action.

For preparing the primary amine, we have discovered a process based on the use of isobutyrophenone as a starting material. This compound is known, and can be prepared by the reaction of isobutyric anhydride with diphenylcadmium or by an acetoacetic ester type of synthesis from benzoyldimethylacetate as indicated in the literature. However, we have found that the starting material may be prepared in excellent yield by the acylation of thiophene-free benzene with isobutyryl halide using a metal halide as the acylation catalyst. Suitable catalysts are stannous chloride, aluminum chloride or aluminum bromide, the preferred catalyst being aluminum chloride.

Briefly outlining the process of the invention isobutyrophenone is benzylated with a benzylating agent such as benzyl halide and preferably benzyl bromide, in the presence of an alkali metal amide or alcoholate such as sodium or potassium amide, methylate, ethylate, etc., and an aromatic solvent such as benzene or toluene to form 1,3-diphenyl-2,2-dimethylpropanone-1. The latter is isolated and cleaved with an alkali metal amide, preferably sodamide, in the presence of benzene or toluene to form 3-phenyl-1-amino-2,2-dimethyl propanone-1 which is obtained in the form of a crystalline precipitate from petroleum ether. The precipitate is then reacted at a temperature of about 50–70° C. in the presence of an alkali metal hydroxide, a halide and water or with an alkali metal hypohalite, such as KOBr, KOCl, NaOBr or NaOCl to form di-(beta-phenyl-alpha-alpha-dimethylethyl) urea. The latter product is then decomposed in the presence of an alkali metal or alkaline earth metal oxide or hydroxide and water to form omega-phenyl-tertiary-butyl-amine. Sodium, potassium or calcium hydroxide, calcium oxide, etc., may be used, the preferred cleavage agent being calcium hydroxide.

In further accordance with our invention, N-alkyl substituted compounds may be obtained by condensing omega-phenyl-tertiary-butyl-amine with an aromatic aldehyde in the presence of ethanol to form a Schiff base which is then reacted with an alkylating agent. The alkylating agent selected depends on the alkyl radical desired in the amino-substituted product. For example, a methylating or ethylating agent may be used such as a methyl or ethyl halide, as for example, methyl iodide or methyl bromide or other alkyl esters such as methyl sulfate, methyl sulfite, etc. By hydrolysis, either acidic or basic, the reaction product yields the N-alkyl-omega-phenyl-tertiary butylamine.

For the preparation of N,N-dialkyl substituted compounds omega-phenyl-tertiary butylamine is alkylated with the same alkylating agents as indicated above, but used in excess and at a temperature below 100° C. The reaction is carried out in the presence of any suitable acid-combining reagent, such as silver oxide or an alkali metal or alkaline earth metal hydroxide or carbonate.

The compounds prepared in accordance with our disclosure are useful either in the free state or as salts of inorganic or organic acids such as hydrochloric, sulfuric, phosphoric, tartaric, lactic, oleic or palmitic acids which are easily prepared in known manner.

In following the process of our invention it is obvious that the process may be applied to the preparation of aralkyl amines where the aryl radical is either unsubstituted or where one or more hydrogens in the aryl radical are replaced by alkyl radicals. For example, one may use dimethoxy benzyl bromide as an alkylating agent and thus produce the corresponding dimethoxyphenyl-tertiary butylamine which is also physiologically active.

The following example illustrates the process in detail but it is to be understood that the example is merely illustrative and not to be considered limitative either of the particular reactants indicated or of the particular conditions described. As will be obvious to those skilled in the art, equivalent substances may be used in place of those mentioned and the reaction conditions may be varied to an appreciable extent.

Preparation of isobutyrophenone

In a 12 liter, 3-necked flask, 1280 grams of aluminum chloride was covered with 2000 cc. of dry thiophene-free benzene and a solution of 919 grams of isobutyryl chloride, (B. P. 92–94° C.) in 1 liter of benzene was added slowly with stirring. After heating for 3 hrs. at reflux, the solution was cooled and poured over a mixture of 1 l. of concentrated hydrochloric acid and 5 kg. of ice. The benzene layer was separated, the aqueous layer extracted with benzene, and the combined benzene solutions were washed, dried and concentrated in vacuo. The residue was distilled rapidly to give 1051 g. of isobutyrophenone, boiling at 81–9° at 1 mm., yield 83.4%.

Preparation of 1,3-diphenyl-2,2-dimethylpropanone-1

Sodamide was prepared from 12.5 grams of sodium added in small portions to 600 cc. of liquid ammonia with 1 g. of hydrous ferric chloride as catalyst. The ammonia was replaced by 200 cc. of dry toluene and without delay a solution of 74 g. of isobutyrophenone and 76.5 g. of benzyl bromide in 200 cc. of benzene was slowly added with stirring. The reaction mixture was heated on a boiling water bath for 48 hrs. Water was then added, the organic layer separated and the product isolated by distillation. The 1,3-diphenyl-2,2-dimethylpropanone-1 boiled from 142–143° C. at a pressure of 3 mm., $N_D^{20}$ 1.5652.

Preparation of alpha-alpha-dimethyl-beta-phenylpropionamide

Sodamide was prepared from 7.6 g. of sodium in 350 cc. of liquid ammonia with 0.9 g. of hydrous ferric chloride. The ammonia was replaced by 250 cc. of toluene, the mixture was heated to 60° and 71.4 g. of 1,3-diphenyl-2,2-dimethyl propanone-1 dissolved in 150 cc. of toluene was added. The mixture was stirred and heated on a steam bath for 5 hours. A clear red color appeared in 15 minutes and disappeared after about an hour. After cooling, water was added, the organic layer was washed, dried, and concentrated to give 36.5 g. of alpha,alpha-dimethyl-beta-phenyl propionamide which crystallized slowly after the addition of an equal volume of petroleum ether. The product melted at 62° C. after crystallization from benzene-petroleum ether.

Preparation of di-(beta-phenyl-alpha,alpha-dimethylethyl) urea 3.5 grams of alpha, alpha-dimethyl-beta-phenylpropionamide in 420 cc. of water was added to a solution of 87.5 grams of potassium hydroxide and 35 grams of bromine in 350 cc. of water. After 2 hours at 60° C., the product was obtained on crystallization from ethanol, melting at 184° C.

Analysis:
Calculated for $C_{21}H_{28}N_2O$: C, 77.73; H, 8.69; N, 8.63
Found: C, 77.41; H, 8.58; N, 8.81

Preparation of omega-phenyl-tert-butylamine 24 grams of the urea derivative obtained as indicated above, were well mixed with 96 grams of calcium hydroxide in a flask immersed in an air bath and provided with a dropping funnel the stem of which reached the bottom of the flask. The mixture was heated to 240–260° C. (inside temperature) for 7 hours during which time 86 cc. of water was slowly added. The vapors were collected in a receiver cooled with ice. After extraction with ether and distillation, the product was obtained as a colorless liquid boiling from 80–84° C. at 9 mm.

Analysis:
Calculated for $C_{10}H_{15}N$: N, 9.4
Found: N, 9.54

Preparation of N-methyl-omega-phenyl-tert-butylamine

A solution of 15.8 g. of omega-phenyl-tertiary-butylamine and 12.1 g. of benzaldehyde in 70 cc. of 95% ethanol was refluxed for 30 minutes. Upon distillation the Schiff base, boiling from 147–9° at 1 mm. was obtained. On standing, the material partially solidified, probably due to the presence of a solid geometric isomer.

Analysis:
Calculated for $C_{17}H_{19}N$: N, 5.81
Found: N, 5.66

A mixture of 24 g. of Schiff base and 15.4 g. of methyl iodide was put in a sealed tube and heated in a steam bath for 20 hours. After cooling, the solid content of the tube was dissolved in 90 cc. of methanol and 8 cc. of water by refluxing for 30 minutes. The orange solution was poured into 100 cc. of 15% acetic acid and boiled for 2.5 hours. After addition of enough 30% sodium hydroxide to make the solution strongly alkaline, the product was extracted by ether and distilled to give the desired product as a colorless liquid boiling from 75–9° at 1 mm.

Analysis:
Calculated for $C_{11}H_{17}N$: C, 81.0; H, 10.5; N, 8.6
Found: C, 80.57; H, 10.59; N, 8.33

Pharmacological tests indicate that N-methyl-omega-phenyl-tertiary-butylamine is substantially no more toxic than benzedrine and has substantially the same toxicity as the unsubstituted amine compound.

When investigated for cerebral stimulation, the unsubstituted amine compound was found to have strong cerebral stimulating activity, proving to possess about 1½ to 2½ times the cerebral stimulation of the N-methyl compound, using dogs, cats and chicks as the test animals under approved pharmacological test methods. Thus, the unsubstituted amine compound shows considerably more central stimulating activity than the N-methyl compound. This physiological effect may or may not be desirable depending on the use contemplated for the compounds. However, when only a vasopressor action is desired, strong cerebral stimulation is obviously undesirable.

It was also found that for a given degree of pressor action, the N-methyl compound is effective for more than twice the duration of time in which the unsubstituted amine compound is effective. In vasopressor compounds, a long duration of action is of primary importance. In summary, when considered for use primarily for vasopressor effect, such as a nasal inhalant for shrinking the nasal mucosa, the N-methyl free base or its salts is superior to the unsubstituted amine compound because of its remarkably longer duration of action and its substantially lower central stimulating effect.

We claim:

1. The method of preparing an N-alkyl-omega-phenyl tertiary-butylamine comprising adding a mixture of isobutyrophenone and a benzylating agent having the formula

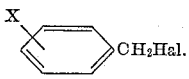

wherein Hal. stands for a halogen radical and X represents a member of the group consisting of hydrogen and lower alkyl radicals, to an alkaline material of the group consisting of alkali metal amide and alkali metal alcoholate, cleaving the diaryl reaction product formed in the preceding step by contact with an alkali metal amide, treating the amido reaction product thus obtained with an alkali metal hypohalite to form a substituted urea, decomposing the latter by aqueous, alkaline hydrolysis to form an amine, condensing said amine with benzaldehyde to form a Schiff base, reacting the latter with a lower alkyl halide alkylating agent, hydrolyzing the alkylated reaction product and finally separating the desired product from the reaction mixture.

2. New compounds selected from the group consisting of secondary amines having the formula

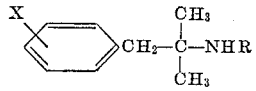

where X represents a radical of the group consisting of hydrogen and lower alkyl radicals and R stands for a lower alkyl; and the acid-addition salts thereof.

3. The acid-addition salts of N-methyl-omega-phenyl-tertiary-butylamine.

4. The new compound, N-methyl-omega-phenyl-tertiary-butylamine.

LIESE L. ABELL.
WILLIAM F. BRUCE.
JOSEPH SEIFTER.

REFERENCES CITED

The following references are of record in the file of this patent:

UNITED STATES PATENTS

| Number | Name | Date |
|---|---|---|
| 2,427,887 | Wallace | Sept. 23, 1947 |
| 2,443,206 | Suter | June 16, 1948 |

OTHER REFERENCES

Taylor et al., "Sidgwick's Organic Chemistry of Nitrogen," (Oxford, at the Clarendon Press, 1937), page 58.

Mee, "Richter's Organic Chemistry," (Elsevier Pub. Co., N. Y., 1946), vol. 3, pages 283–284.

Dumesnil, "Comptes Rendus," vol. 157, pages 53–55 (1913).

Mentzer, "Comptes Rendus," vol. 213, pages 581–584 (1941).

Haller et al., "Compt. Rend.," vol. 149, pp. 5–10 (1909).

Degering, "Organic Nitrogen Compounds," (University Litho, Ypsilanti, Mich., 1945), pp. 406–407.

Ide et al., J. A. C. S., vol., 59, pp. 726–731 (1937).

Dumesnil, "Comptes Rendus," vol. 153, pp. 111–113 (1911).